United States Patent
Shepherd et al.

(10) Patent No.: US 6,514,611 B1
(45) Date of Patent: Feb. 4, 2003

(54) ANISOTROPIC MELT-FORMING POLYMERS HAVING A HIGH DEGREE OF STRETCHABILITY

(75) Inventors: James P. Shepherd, Springfield, NJ (US); H. Clay Linstid, III, Clinton, NJ (US); Vincent J. Provino, Clifton, NJ (US)

(73) Assignee: Ticona LLC, Summit, NJ (US)

( * ) Notice: Subject to any disclaimer, the term of this patent is extended or adjusted under 35 U.S.C. 154(b) by 0 days.

(21) Appl. No.: 09/933,645

(22) Filed: Aug. 21, 2001

(51) Int. Cl.⁷ .................. B32B 27/08; B32B 27/32; B32B 27/36; C08G 63/00
(52) U.S. Cl. .................. 428/373; 428/480; 428/483; 528/176; 528/190; 528/194; 528/195; 528/298; 528/302; 528/308; 528/308.6
(58) Field of Search .................. 428/36.6, 36.7, 428/373, 480, 483; 528/176, 190, 194, 195, 298, 302, 308, 308.6

(56) References Cited

U.S. PATENT DOCUMENTS

| | | | |
|---|---|---|---|
| 4,351,918 A | 9/1982 | Charbonneau et al. | 524/602 |
| 4,370,466 A | 1/1983 | Siemionko | 528/190 |
| 4,522,974 A | 6/1985 | Calundann et al. | 524/605 |
| 4,563,508 A | 1/1986 | Cottis et al. | 525/444 |
| 4,684,712 A | 8/1987 | Ueno et al. | 528/190 |
| 4,722,993 A | 2/1988 | Hisgen et al. | 528/183 |
| 4,912,193 A | 3/1990 | Dicke et al. | 528/193 |
| 4,918,154 A | 4/1990 | Hayashi et al. | 528/190 |
| 4,920,197 A | 4/1990 | Hayashi et al. | 528/190 |
| 4,937,310 A | 6/1990 | Hayashi et al. | 528/193 |
| 4,966,956 A | 10/1990 | Andreu et al. | 528/185 |
| 4,983,713 A | 1/1991 | Hayashi et al. | 528/190 |
| 5,025,082 A | 6/1991 | Kishiro et al. | 528/190 |
| 5,037,939 A | 8/1991 | Eckhardt et al. | 528/193 |
| 5,066,767 A | 11/1991 | Matzner et al. | 528/193 |
| 5,089,594 A | 2/1992 | Stern et al. | 528/194 |
| 5,204,443 A | 4/1993 | Lee et al. | 528/184 |
| 5,364,669 A * | 11/1994 | Sumida et al. | 428/1.5 |
| 5,399,656 A | 3/1995 | Nitta et al. | 528/193 |
| 5,656,714 A | 8/1997 | Shen et al. | 528/193 |
| 5,663,276 A | 9/1997 | Yoneta et al. | 528/194 |
| 5,798,432 A | 8/1998 | Lee et al. | 528/176 |
| 6,132,884 A | 10/2000 | Linstid, III et al. | 428/480 |
| 6,207,790 B1 | 3/2001 | Linstid, III et al. | 528/190 |
| 6,222,000 B1 | 4/2001 | Linstid, III et al. | 528/190 |
| 6,268,026 B1 * | 7/2001 | Jester et al. | 264/173.11 |

FOREIGN PATENT DOCUMENTS

| | | |
|---|---|---|
| EP | 0911150 | 4/1999 |
| EP | 0928683 | 7/1999 |
| WO | WO 00/66647 | 11/2000 |

OTHER PUBLICATIONS

R.S. Irwin, "Chain Folding in Thermotropic Polyesters", Macromolecules 1993, vol. 26, pp. 7125–7133.
W. J. Jackson, Jr., "Liquid Crystalline Aromatic Polyesters: An Overview", Journal of Applied Polymer Science: Applied Polymer Symposium, vol. 41, pp. 25–33 (1985).
D. S. Nagvekar et al, "New Wholly-Aromatic Thermotropic Polyesters with Controlled Flexibility", Materials Research Symposium Paper, Spring 1999.
Anisotropic Polymers, Their Synthesis and Properties, G.W. Calundann and M. Jaffe, pp 247–291, Proceedings of the Robert A. Welch Conferences on Chemical Research XXVI, Synthetic Properties, 1982.

* cited by examiner

*Primary Examiner*—Vivian Chen
(74) *Attorney, Agent, or Firm*—Karen E. Klumas

(57) ABSTRACT

Highly stretchable, anisotropic melt-forming polymers consisting essentially of recurring units derived from p-hydroxybenzoic acid, 6-hydroxy-2-naphthoic acid, isophthalic acid, terephthalic acid and hydroquinone are disclosed.

16 Claims, No Drawings

ANISOTROPIC MELT-FORMING POLYMERS HAVING A HIGH DEGREE OF STRETCHABILITY

BACKGROUND OF THE INVENTION

1. Field of the Invention

This invention relates to stretchable anisotropic melt-forming polymers suitable for use in the production of a variety of shaped articles including films, fibers and blow-molded forms. This invention also relates to shaped articles made from such polymers, including multilayer laminates having at least one layer formed from such polymers.

2. Description of the Prior Art

Anisotropic melt-forming polymers, also known as liquid crystalline polymers or "LCPs", are well known in the art. Anisotropic melt-forming polymers exhibit a parallel ordering of molecular chains in the melt phase and are also termed "thermotropic" liquid crystalline polymers. Many of these materials are wholly aromatic in nature.

Thermotropic polymers include aromatic copolyesters having recurring units derived from p-hydroxybenzoic acid, at least one aromatic diol and at least one aromatic dicarboxylic acid, as well as wholly aromatic copolyesteramides having recurring units derived from p-hydroxybenzoic acid, at least one aromatic diol, at least one aromatic diacid, and aminophenol. Without the inclusion of recurring units that disrupt the crystalline structure, such polymers tend to have very high melting points, for example, 360° C. and above, making them difficult to melt fabricate. Incorporation of recurring units that provide non-parallel or "kinky" linkages is a common means of lowering melting point. These kinky linkages include "meta" or 1,3-aromatic ring structures.

Common materials from which meta linkages are derived include m-hydroxybenzoic acid, isophthalic acid, resorcinol, and m-aminophenol. U.S. Pat. Nos. 4,563,508; 5,037,939; and 5,066,767 disclose polymers containing recurring units derived from p-hydroxybenzoic acid, terephthalic acid, isophthalic acid, hydroquinone and 4,4'-biphenol; U.S. Pat. No. 4,912,193 discloses polymers having recurring units derived from p-hydroxybenzoic acid, 4,4'-biphenol, terephthalic acid and isophthalic acid; U.S. Pat. No. 4,966,956 discloses polymers having recurring units derived from p-hydroxybenzoic acid, terephthalic acid, isophthalic acid, 4,4'-biphenol and aminophenol; U.S. Pat. No. 5,663,276 discloses polymers having recurring units derived from p-hydroxybenzoic acid, terephthalic acid, 4,4'-biphenol, isophthalic acid, hydroquinone and 4,4'-biphenyldicarboxylic acid; U.S. Pat. No. 5,089,594 discloses polymers having recurring units derived from p-hydroxybenzoic acid, terephthalic acid, isophthalic acid, 4,4'-biphenol, and an aromatic diol, for example, hydroquinone; U.S. Pat. No. 4,722,993 discloses polymers having recurring units derived from m-aminophenol, p-hydroxybenzoic acid, terephthalic and/or isophthalic acid, one or more of hydroquinone, 4,4'-biphenol or resorcinol and, if desired, m-hydroxybenzoic acid; U.S. Pat. No. 5,399,656 discloses polymers having recurring units derived from p-hydroxybenzoic acid, terephthalic acid, resorcinol and an aromatic diol, for example, 4,4'-biphenol; U.S. Pat. No. 5,025,082, discloses polymers having recurring units derived from p-hydroxybenzoic acid, terephthalic acid, 4,4'-biphenol, 2,6-naphthalene dicarboxylic acid, and at least one aromatic diol selected from hydroquinone, methylhydroquinone, trimethylhydroquinone, resorcinol and tetramethylbiphenol; and U.S. Pat. No. 5,798,432 discloses polymers having recurring units derived from p-hydroxybenzoic acid, 2,6-naphthalene dicarboxylic acid, terephthalic acid, isophthalic acid, hydroquinone, p-aminophenol and 4,4'-biphenol.

The presence of meta linkages notwithstanding, aromatic polymers derived from p-hydroxybenzoic acid, at least one aromatic dicarboxylic acid and at least one aromatic diol and/or aminophenol, as set forth in the patents noted above, tend to have highly ordered crystalline structures and, although drawable in the melt, generally lack the ability to be stretched to a significant degree at temperatures below the molten state.

Another class of thermotropic polymers have recurring units derived from p-hydroxybenzoic acid, 6-hydroxy-2-naphthoic acid, at least one aromatic diacid and at least one aromatic diol. The incorporation of meta linkages into such polymers is described, for example, in the following: U.S. Pat. No. 4,522,974 disclosing polymers having recurring units derived from p-hydroxybenzoic acid, 6-hydroxy-2-naphthoic acid, hydroquinone and isophthalic and/or terephthalic acid; U.S. Pat. No. 4,920,197 disclosing polymers having recurring units derived from p-hydroxybenzoic acid, 6-hydroxy-2-naphthoic acid, terephthalic acid, isophthalic acid and resorcinol; U.S. Pat. No. 4,937,310 disclosing polymers having recurring units derived from p-hydroxybenzoic acid, 6-hydroxy-2-naphthoic acid, terephthalic acid, isophthalic acid and resorcinol; U.S. Pat. No. 4,918,154 disclosing polymers having recurring units derived from p-hydroxybenzoic acid, 6-hydroxy-2-naphthoic acid, terephthalic and/or isophthalic acid, resorcinol and hydroquinone; and U.S. Pat. No. 4,983,713 disclosing polymers having recurring units derived from p-hydroxybenzoic acid, 6-hydroxy-2-naphthoic acid, terephthalic acid, 4,4'-biphenol, and isophthalic acid. The polymers set forth in the examples of these patents tend to have ordered crystalline structures and are not considered to be highly stretchable materials.

More recent patents disclose liquid crystalline polymers that include stretchable materials. U.S. Pat. No. 5,656,714 discloses amorphous and what are termed "semi-crystalline" polymers having recurring units derived from p-hydroxybenzoic acid, 6-hydroxy-2-naphthoic acid, terephthalic acid, 4,4'-biphenol, and resorcinol. Fibers made from the amorphous polymers of Examples I and IX were respectively reported to be drawn to 73 and 30 times their as-spun length. Apart from Examples I and IX, no additional data regarding the stretchability of the exemplified polymers is provided. The polymers exemplified by U.S. Pat. No. 5,656,714 vary in terms of their degree of crystallinity; some, but not all, of these polymers are highly stretchable.

U.S. Pat. Nos. 6,132,884; 6,207,790; and 6,222,000 disclose highly stretchable amorphous anisotropic melt-forming polymers having recurring units derived from p-hydroxybenzoic acid, 6-hydroxy-2-naphthoic acid, one or more aromatic monomers that provide the resulting polymer with selected meta-linkages, one or more aromatic diacids, and an aromatic diol and/or hydroxyamine, at least a portion of which is biphenol. These patents also disclose stretched articles made from such polymers. According to these patents, in order to produce highly stretchable amorphous anisotropic polymers, it is necessary to provide the polymers with specific recurring units in narrowly defined amounts. The polymers described by all three of these patents are required to contain both meta-linkages and at least about 5 mole percent of recurring units derived from biphenol.

LCPs that are stretchable at lower temperatures have a diverse range of end-use applications. Amorphous LCPs having a Tg (i.e., onset of the glass transition temperature as measured by differential scanning calorimetry or "DSC") of 150° C. or less that are highly stretchable at temperatures above Tg, but below the temperature at which the LCP is in the molten state, are of particular interest in the production of articles that are stretched, drawn or otherwise processed at lower temperatures. Liquid crystalline polymers that are stretchable at temperatures below the processing temperatures of conventional film-forming polymers, for example, polyolefins or polyalkylene terephthalates such as PBT or PET, may be particularly desirable for use in the production of multilayer articles having one or more layers of such conventional film-forming polymers, for example, films, laminates, blow-molded containers, and the like. In these multi-layer applications, the barrier, mechanical and/or optical properties of liquid crystalline polymers may provide advantages that are typically not obtained from conventional thermoplastics. EPO 928 683 A2, published Jul. 14, 1999, discloses a variety of multilayer laminates, including laminates formed from wholly aromatic, liquid crystalline polymers of the type disclosed in U.S. Pat. No. 5,656,714.

Additional anisotropic melt-forming polymers that have a high degree of stretchability are desired.

SUMMARY OF THE INVENTION

Polymers having recurring units derived from p-hydroxybenzoic acid, 6-hydroxy-2-naphthoic acid, terephthalic acid and hydroquinone tend to have a more densely packed crystalline structure than otherwise identical polymers wherein the recurring units derived from hydroquinone are replaced by recurring units derived from biphenol. U.S. Pat. Nos. 6,132,884; 6,207,790; and 6,222,000 teach that in order to produce highly stretchable polymers from p-hydroxybenzoic acid, 6-hydroxy-2-naphthoic acid, an aromatic diacid, and an aromatic diol, it is necessary to incorporate into the polymer both selected meta-linkages and recurring units derived from biphenol. The presence of biphenol in such polymers generally "opens up" their crystalline structure. Polymers having a less densely packed or more "open" crystalline structure tend to be more easily stretched when heated above $T_g$. Based on the teaching of these patents, one skilled in the art seeking to produce a stretchable polymer would not be led to eliminate biphenol linkages from the described polymers.

It has now been found that by adjusting the mole percentages of the component recurring units to specific ranges, highly stretchable anisotropic melt-forming polymers can be derived from p-hydroxybenzoic acid, 6-hydroxy-2-naphthoic acid, terephthalic acid, isophthalic acid, and hydroquinone. In one embodiment, the present invention is directed to an anisotropic melt-forming polymer consisting essentially of recurring units I, II, II, IV, and V wherein recurring unit I is:

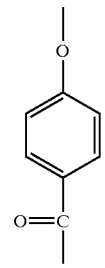

recurring unit II is:

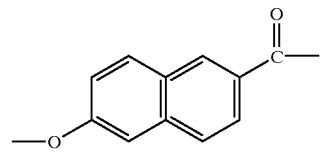

recurring unit III is:

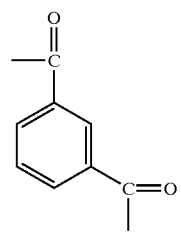

recurring unit IV is:

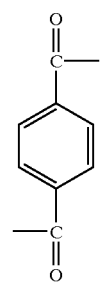

and recurring unit V is:

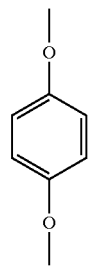

wherein recurring unit I is present in the polymer in an amount of from about 20 to about 40 mole percent, recurring unit II is present in the polymer in an amount of from about 25 to about 50 mole percent, recurring unit III is present in the polymer in an amount of from about 7.5 to about 25 mole percent, recurring unit IV is present in the polymer in an amount of from about 2.5 to about 12.5 mole percent, and recurring unit V is present in the polymer in an amount of from about 10 to about 27.5 mole percent and wherein recurring units I and II combined are present in the polymer in an amount of from about 45 to about 75 mole percent, and the mole ratio of recurring unit III to recurring unit is at least about 1. In further embodiments, this invention is directed to stretched articles formed from such polymers.

DETAILED DESCRIPTION OF THE INVENTION

The extent to which a polymer can be stretched or drawn depends upon the temperature at which stretching occurs, as well as the form and size of the material that is being stretched. As used herein "highly stretchable" polymers refer to polymers that exhibit a percentage of break strain at break point (herein also referred to as the polymer's degree of stretchability) of at least about 100% when spun into tapes that are tested in accordance with the Tape Stretching Procedure set forth below.

The anisotropic melt-forming or liquid crystalline polymers of the subject invention are considered to be amorphous in that they lack a well defined melting point or $T_m$ (i.e., a solid to nematic endothermic peak as measured by differential scanning calorimetry). Despite the absence of a classic melting point, the subject polymers possess a solid to nematic fluid transition temperature that defines their melt processability. The polymers of the subject invention are melt processable at temperatures below about 270° C. Additionally, such polymers have $T_g$ values of about 150° C. or less. Preferably, the polymers have $T_g$ values of about 130° C. or less, most preferably about 120° C. or less. For co-extrusion applications with polyolefins, polymers that are melt processable at temperatures at or below 220° C. are of particular interest.

Anisotropic melt-phase forming polymers formed by the present invention consist essentially of at least five different recurring units. Unit I of the subject polymers, termed a para-oxybenzoyl unit, possesses the structural formula:

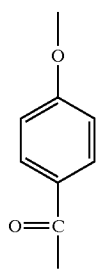

I

While not specifically illustrated in the structural formula, at least some of the hydrogen atoms present on the aromatic ring of unit I may be substituted. Included among the representative precursors from which recurring unit I may be derived are: 4-hydroxybenzoic acid; 3-chloro-4-hydroxybenzoic acid; 3-methyl-4-hydroxybenzoic acid; 3-methoxy-4-hydroxybenzoic acid 3-phenyl-4-hydroxybenzoic acid; 3,5-dichloro-4-hydroxybenzoic acid; 3,5-dimethyl-4-hydroxybenzoic acid; 3,5-dimethoxy-4-hydroxybenzoic acid; and the like. In a preferred embodiment, no ring substitution is present on recurring unit I. Recurring unit I is present in the polymers of the subject invention in an amount of from about 20 to about 40 mole percent, preferably from about 30 to about 40 mole percent.

Recurring unit II of the subject polymers, termed a 6-oxy-2-naphthoyl unit, possesses the structural formula:

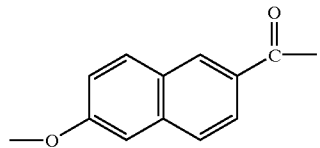

As in the case of recurring unit I, at least some of the hydrogen atoms present on the aromatic ring structure of recurring unit II may be substituted. Exemplary of such substituents are alkyl groups of 1 to 4 carbon atoms, alkoxy groups of 1 to 4 carbon atoms, phenyl, halogen (e.g., Cl, Br, and I), and mixtures thereof. Representative of the precursors from which recurring unit II may be derived are aromatic hydroxy-naphthaoic acids which include: 6-hydroxy-2-naphthoic acid; 6-hydroxy-5-chloro-2-naphthoic acid; 6-hydroxy-5-methyl-2-naphthoic acid; 6-hydroxy-5-methoxy-2-naphthoic acid; 6-hydroxy-5-phenyl-2-naphthoic acid; 6-hydroxy-7-chloro-2-naphthoic acid; 6-hydroxy-5,7-dichloro-2-naphthoic acid, and the like. In a preferred embodiment no ring substitution is present on recurring unit II. Recurring unit II is present in the subject polymers in an amount of from about 25 to about 50 mole percent, preferably from about 25 to about 40 mole percent. Additionally, recurring units I and II combined constitute from about 45 to about 75 mole percent, preferably about 55 to about 70 mole percent of the subject polymers.

Recurring unit III of the subject polymers, termed an isophthaloyl unit, possesses the structural formula:

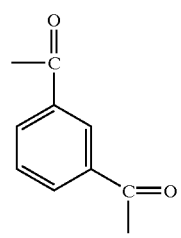

III

Although not specifically shown in the formulas give, the aromatic ring structure of recurring unit III may be substituted in a manner similar to that described for recurring unit I. Preferably no ring substitution is present in recurring unit III. Representative of the precursors from which recurring unit III may be derived are isophthalic acid, 5-chloro-1,3-benzene dicarboxylic acid, 5-phenyl-1,3-benzene dicarboxylic acid, 5-methyl-1,3-benzene dicarboxylic acid, 5-sulfonyl-1,3-benzene dicarboxylic acid, and the like. In a preferred embodiment no ring substitution is present on recurring unit III. Recurring unit III is present in the polymers of the subject invention in an amount of from about 7.5 to about 25 mole percent, preferably from about 7.5 to about 20 mole percent.

Recurring unit IV of the subject polymers, termed a terephthaloyl unit, possesses the structural formula:

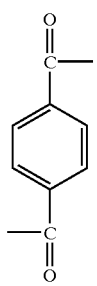

IV

Although not specifically shown in the formulas give, the aromatic ring structure of recurring unit IV may be substituted in a manner similar to that described for recurring unit I. Preferably no ring substitution is present in recurring unit IV. Representative of the precursors from which recurring unit IV may be derived are terephthalic acid, 2-chloro-1,4-benzene dicarboxylic acid, 2-methyl- 1,4-dicarboxylic acid, and the like. In a preferred embodiment no ring substitution is present on recurring unit IV. Recurring unit IV is present in the polymers of the subject invention in an amount of from about 2.5 to about 12.5 mole percent, preferably from about 2.5 to about 10 mole percent. In the practice of this invention, the mole ratio of recurring unit III to recurring unit IV is at least about 1:1, preferably the mole ratio of recurring unit III to recurring unit IV is from about 1:1 to about 10:1.

Recurring unit V of the subject polymers, termed a 1,4-dioxyphenyl unit, possesses the formula:

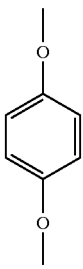

V

Although not specifically illustrated in the structural formula given, the aromatic ring structure of recurring unit V may be substituted in a manner similar to that described for recurring unit I. Representative of the precursors from which recurring unit V may be derived are hydroquinone, 2-chlorohydroquinone, 2-methylhydroquinone, and 2-phenylhydroquinone. Preferably, no ring substitution is present on recurring unit V. Recurring unit V is present in the polymers of the subject invention in an amount of from about 10 to about 27.5 mole percent, preferably from about 15 to about 25 mole percent Minor amounts of other units that provide ester or ester-amide linkages may be present, provided that such units do not obviate the properties desired by this invention. For example, a portion of recurring unit V may be substituted with linkages derived from 4-aminophenol, and/or a portion of recurring unit I may be substituted with linkages derived from 4-aminobenzoic acid. When such other units are present, the total amount thereof typically should not exceed about 5 mole percent of the resulting polymer. It will be apparent to those skilled in the art that the total amount of dioxy and oxy-amino units present in the subject polymers will be substantially equal to the total amount of dicarboxy units. In general, the various recurring units will be present in the resultant polymers in a random configuration. Preferably the polymers are wholly aromatic materials.

The polymers formed by the process of this invention commonly exhibit a weight average molecular weight of from about 10,000 to about 80,000. The molecular weight of preference will depend, in part, on the intended end-use application. For example, in fiber and film applications, weight average molecular weights of from about 20,000 to about 40,000 are commonly of interest. The polymers typically exhibit an inherent viscosity (I.V.), measured at 25° C. as a 0.1% by weight solution of polymer in a mixture of equal volumes of pentafluorophenol and hexafluoroisopropanol, of at least about 1.0 dl/g, with polymers having inherent viscosities of from about 3.0 dl/g to about 7.0 dl/g being of particular interest in many applications.

Characteristic of the subject polymers is the formation of an anisotropic melt phase. Thus, in the melt there is a tendency for the polymer chains to orient in the shear direction. Such thermotropic properties are manifest at a temperature which is amenable for melt processing to form shaped articles. Anisotropy in the melt may be confirmed by conventional polarized light microscopy techniques.

The polymers of this invention have a degree of stretchability of at least about 100% and preferably have a degree of stretchability of at least about 200%, measured in accordance with the Tape Stretching Procedure set forth below; polymers having a degree of stretchability of at least about 500%, pursuant to such procedure are of particular interest. The liquid crystalline polymers of this invention also have much greater gas barrier resistance than many non-liquid crystalline thermoplastics conventionally used in packaging applications, for example, polyolefins and polyalkylene terephthalates. The barrier properties of the subject polymers, coupled with their ability to be stretched to a high degree at temperatures typically used to stretch such non-liquid crystalline thermoplastics, i.e., from about 140° C. to about 200° C., make the subject polymers particularly well-suited for use in multilayer laminates and containers for food and other packaging applications that require oxygen permeability resistance.

The polymers of this invention are typically prepared by a polymerization reaction that proceeds through the acetylated form of the hydroxycarboxylic acid and diol reactants. Thus, it is possible to employ as starting materials reactants having pre-acetylated hydroxyl groups, heat the reaction mix to polycondensation temperature and maintain reaction until a desired polymer viscosity is reached. Alternatively, it is possible to acetylate in situ, in which case the aromatic hydroxycarboxylic acid and aromatic diol are reacted with acetic anhydride, acetic acid by-product is removed, the esterified reactants together with the aromatic diacid are heated to polycondensation temperature, and reaction is maintained until a desired polymer viscosity is reached. The aromatic diacid reactant may, but need not, be present during the acetylation reaction. If the acetylation and polycondensation reactions are conducted in a single reactor, it is common to charge the reactor with the reactant materials in a single step.

Using separate acetylation and polymerization reactors, it may be desirable to introduce the diacid component to the polymerization reactor as opposed to the acetylation reactor. The acetylation and polycondensation reactions are typically conducted in the presence of suitable catalysts. Such catalysts are well known in the art and include, for example, alkali and alkaline earth metal salts of carboxylic acids, such as, for example, potassium acetate, sodium acetate, magnesium acetate, and the like. Such catalysts are typically used in amounts of from about 50 to about 500 parts per million based on the total weight of the recurring unit precursors.

Acetylation is generally initiated at temperatures of about 90° C. In the initial stage of the acetylation reflux is desirably employed to maintain vapor phase temperature below the point at which acetic acid by-product and anhydride begin to distill. Temperatures during the initial stage of acetylation typically range from between 90° to 150° C., preferably about 100° to about 130° C. In order to complete the acetylation, the reaction mixture is then heated to final melt temperature of about 150° to about 220° C., preferably about 150° to about 200° C., with temperatures of 180° to 200° C. being of particular interest. At this point, if reflux is used, the vapor phase temperature should exceed the boiling point of acetic acid but remain low enough to retain residual acetic anhydride.

To ensure substantially complete reaction, it may be desirable to utilize an excess amount of acetic anhydride in conducting the acetylation. The amount of excess anhydride utilized will vary depending upon the particular acetylation conditions employed, including the presence or absence of reflux. The use of an excess of from about 1 to about 10 mole percent of acetic anhydride, based on the total moles of reactant hydroxyl groups present is not uncommon.

To obtain both complete acetylation and maintenance of stoichiometric balance, anhydride loss should be minimized. Acetic acid vaporizes at temperatures of about 118° C. At higher temperatures, i.e., about 140° C. acetic anhydride also begins to vaporize. Providing the reactor with a means of controlling vapor phase reflux is desirable. Maintaining vapor phase reflux temperature at about 120° to about 130° C. is particularly desirable.

Polycondensation of the acetylated starting materials generally begins to take place at a temperature within a range of from about 210° to about 260° C. As acetic acid is also a by-product of the polymerization reaction, it is desirable to employ controlled vapor phase reflux when conducting the polycondensation reaction. In the absence of controlled vapor phase reflux, acetic anhydride, acetoxybenzoic acid and other volatile materials are vaporized as the polymerization temperature is increased. Depending on the particular polymer synthesized, it is preferable to maintain vapor phase reflux temperatures of about 120° to about 130° C. during the polymerization reaction.

As the final polymerization temperature is approached, volatile by-products of the reaction having boiling points above that of acetic acid and acetic anhydride should be removed. Accordingly at reactor temperatures of about 250° to about 300° C., vapor phase reflux, if used, is generally adjusted to allow higher vapor phase temperatures or is discontinued. The polymerization is generally allowed to proceed until a desired polymer viscosity is reached. To build molecular weight in the melt, the polymerization reaction is generally conducted under vacuum, the application of which facilitates the removal of volatiles formed during the final stage of the polycondensation.

Following polymerization, the molten polymer is discharged from the reactor, typically through an extrusion orifice fitted with a die of desired configuration; cooled; and collected. Commonly, the melt is discharged through a perforated die to form strands that are taken up in a water bath, pelletized and dried.

In an embodiment of particular interest, this invention is directed to highly stretchable, amorphous anisotropic melt-forming polymers that consist essentially of recurring units I, II, III, IV and V, as described above, wherein recurring unit I is present in the polymer in an amount of from about 30 to about 40 mole percent, recurring unit II is present in the polymer in an amount of from about 25 to about 40 mole percent, recurring unit III is present in the polymer in an amount of from about 7.5 to about 20 mole percent, recurring unit IV is present in the polymer in an amount of from about 2.5 to about 10 mole percent, and recurring unit V is present in the polymer in an amount of from about 15 to about 25 mole percent and wherein recurring units I and II combined are present in the polymer in an amount of from about 55 to about 70 mole percent, and the mole ratio of recurring unit III to recurring unit IV is from about 1:1 to about 10:1.

The polymers of the present invention are particularly well suited for use in extrusion and co-extrusion applications such as the production of fiber, film, sheet, blow molded articles, and the like.

Fibers that can be produced using the subject liquid crystalline polymers include monfilament, multiflament and bicomponent fibers. Bicomponent fibers are well known and may be defined as a fiber having at least two distinct cross-sectional domains respectively formed from polymers having different relative viscosities. The distinct domains may be formed by at least two different polymers, or the same polymer class having different relative viscosities. Bicomponent fibers are intended to include, but are not limited to core and sheath fiber structures, side-by-side fiber structures, tipped fiber structures, micro-denier structures and mixed fiber structures. These type of bicomponent fiber structures are described in U.S. Pat. No. 6,074,590, incorporated herein by reference.

Film, sheet and shaped articles that can be produced using the subject liquid crystalline polymers include mono- and multi-layer structures. In multilayer applications, the subject polymers can be present as one or more layers of a structure that includes one or more layers formed from a thermoplastic resin, which resin comprises, for example, a thermoplastic polymer selected from polyolefins (e.g., polyethylene and polypropylene), polyesters (e.g., polyethylene terephthalate, polybutylene terephthalate, and polyethylene naphthalate), and polyamides.

Multilayer film and sheet structures may be made by conventional processes, such as, for example, co-extrusion, dry lamination, sandwich lamination, coextrusion coating, and the like. The subject polymers may also be used to form single- or multilayer tubes, bags, bottles, tanks and other containers such as are produced by extrusion, extrusion blow molding, injection blow molding, stretch blow molding, or other conventional processes for forming such articles.

Multilayer laminates may further contain one or more adhesive layers formed from adhesive materials such as, for example, polyester polyurethanes, polyether polyurethanes, polyester elastomers, polyether elastomers, polyamides, polyether polyamides, polyether polyimides, functionalized polyolefins, and the like. Exemplary of such adhesives are ethylene-maleic anhydride copolymers, ethylene-methyl acrylate copolymers, ethylene-methyl acrylate copolymer grafted with maleic anhydride, ethylene-methyl acrylate maleic acid terpolymer, ethylene-gylcidyl methacrylate copolymer, ethylene-methylacrylate-glycidyl methacrylate terpolymer, ethylene-methyl methacrylate-acrylic acid terpolymer, ethylene-vinyl acetate copolymer, alkoxysilane modified ethylene-ethylacrylate copolymer, ethylene-acrylic acid copolymer, and blends of polypropylene grafted with maleic anhydride with a dimer based polyamide. Although the polymers produced by the process of this invention are particularly well suited for extrusion and co-extrusion applications such as the production of fiber, film, sheet, blow molded articles, and the like, they may also be used in the production of injection molded parts. If desired, compositions containing the subject polymers may contain one or more additional optional components such as for example, colorants, lubricants, processing aids, stabilizers, fillers, reinforcing agents, and the like. Fillers and reinforcing agents are not, however, typically present in compositions used in fiber, film and blow molding applications.

EXAMPLES

The following examples are presented to further illustrate this invention. The examples are not, however, intended to limit the invention in any way.

Examples 1 to 9 and Comparative Examples C1 to C7

To a 3-necked cylindrically shaped flask equipped with a stainless steel "C"-shaped agitator, gas inlet tube, thermocouple, distilling trap and Vigreux column attached to a condenser and receiver were added:

248.4 grams of p-hydroxybenzoic acid
282.0 grams of 6-hydroxy-2-naphthoic acid
99.6 grams of terephthalic acid
124.5 grams of isophthalic acid
148.5 grams of hydroquinone
627.8 grams of acetic anhydride
0.12 grams of potassium acetate (60 ppm)

The flask was purged of oxygen by evacuation and flushing with dried nitrogen and immersed into an electrically heated fluidized sand bath. The contents of the flask were heated to ~150° C. while stirring at 75 rpm to acetylate hydroxyl groups. Temperature was raised from 150° to 220° C. over a period of 70 minutes to distill by-product acetic acid. Polymerization commenced at 220° C. and batch temperature was raised to 340° C. over a period of 130 minutes. During this time acetic acid that evolved was removed by distillation. After a 30 minute hold time at 340° C., vacuum was applied, and the pressure gradually reduced to ~5 mm Hg over a period of 20 minutes. The vacuum as maintained until the torque required to maintain agitator speed reached the target value necessary to give the desired melt viscosity. At the target torque the vacuum was discontinued and the flask brought to atmospheric pressure with dry nitrogen.

This process produced a polyester having melt viscosity of 128.3 kpa at a shear rate of 1000 sec$^{-1}$, measured at 270° C. in a capillary rheometer using an orifice 1 mm in diameter and 20 mm long.

DSC (20° C./min. heating rate) indicated that the polymer had a Tg of 109° C.

Additional polymers were made and tested following a similar procedure. Table 1 lists the various Examples and Comparative Examples together with the mole percentages of the reactant monomers employed. Abbreviations are as follows:

"p-HBA" means p-hydroxybenzoic acid;
"HNA" means 6-hydroxy-2-naphthoic acid;
"IA" means isophthalic acid;
"TA" means terephthalic acid; and
"HQ" means hydroquinone.

All polymerizations were conducted in the presence of 60 ppm potassium acetate, using sufficient acetic anhydride to completely acetylate the hydroxyl groups present.

Hot stage microscopy with polarized light confirmed that all of the polymers were optically anisotropic. The polymers contained molar quantities of recurring units that corresponded to the molar charge of the reactant monomers. M. V., and $T_g$ data for the polymers (measured as described above) are reported in Table 2. Excluding those polymers for which a $T_m$ is reported, the polymers were amorphous.

TABLE 1

| Example | REACTANT MONOMERS (Mole %) | | | | |
|---|---|---|---|---|---|
|  | p-HBA | HNA | IA | TA | HQ |
| 1 | 30.0 | 25.0 | 12.5 | 10.0 | 22.5 |
| 2 | 30.0 | 25.0 | 15.0 | 7.5 | 22.5 |
| 3 | 30.0 | 25.0 | 17.5 | 5.0 | 22.5 |
| 4 | 30.0 | 25.0 | 20.0 | 2.5 | 22.5 |
| 5 | 30.0 | 30.0 | 15.0 | 5.0 | 20.0 |
| 6 | 30.0 | 40.0 | 7.5 | 7.5 | 15.0 |
| 7 | 30.0 | 40.0 | 10.0 | 5.0 | 15.0 |
| 8 | 40.0 | 30.0 | 7.5 | 7.5 | 15.0 |
| 9 | 40.0 | 30.0 | 10.0 | 5.0 | 15.0 |
| C1 | 30.0 | 25.0 | 5.0 | 17.5 | 22.5 |
| C2 | 30.0 | 25.0 | 10.0 | 12.5 | 22.5 |
| C3 | 30.0 | 30.0 | 5.0 | 15.0 | 20.0 |
| C4 | 30.0 | 40.0 | 5.0 | 10.0 | 15.0 |
| C5 | 40.0 | 30.0 | 5.0 | 10.0 | 15.0 |
| C6 | 20.0 | 20.0 | 15.0 | 15.0 | 30.0 |
| C7 | 20.0 | 20.0 | 20.0 | 10.0 | 30.0 |

The polymers were melt spun into tapes and their break strain was measured using the Tape Stretching Procedure, a description of which follows. Break strains are reported in Table 2.

Tape Stretching Procedure

Polymers are melt spun into tapes using a Micromelt™ apparatus. The apparatus is equipped with a 0.127 mm by 6.35 mm die. Melt temperatures typically vary between about 290–310° C. depending upon the melt characteristics of the sample. Throughput rates are set at 0.45 cc/min; take-up roller speeds are 2 rpm; and pack pressures typically range from about 80 kg/cm$^2$ to about 100 kg/cm$^2$, depending upon the $T_g$ (or $T_m$) of the polymer. The resulting tapes will have an approximate thickness of 0.05 mm and a width of about 6 mm.

Five test specimens, each 12.7 cm in length are cut from each tape. The thickness of the specimens is measured to the nearest 0.0025 mm and the width to the nearest 0.25 mm. The specimens are placed in a preheated Instron oven, allowed 6 minutes to come to temperature and then tested on an Instron type universal tester (equipped with a thermal chamber), set to a test temperature of 150° C. The gauge length is set at 25 mm and the crosshead speed is set at 50.8 mm/min. The % break strain is calculated at the break point for each specimen and is reported as an average of the five specimens tested.

TABLE 2

| EXAMPLE | TESTING DATA | | | |
|---|---|---|---|---|
|  | M.V. (kpa) | Tg (° C.) | Tm (° C.) | % BREAK STRAIN |
| 1 | 128.3 | 109 | — | 647 |
| 2 | 130.0 | 110 | — | 338 |
| 3 | 137.6 | 113 | — | 262 |
| 4 | 134.1 | 116 | — | 181 |

TABLE 2-continued

| EXAMPLE | TESTING DATA | | | |
| --- | --- | --- | --- | --- |
| | M.V. (kpa) | Tg (° C.) | Tm (° C.) | % BREAK STRAIN |
| 5 | 148.6 | 110 | — | 325 |
| 6 | 137.3 | 109 | — | 233 |
| 7 | 164.4 | 109 | — | 397 |
| 8 | 135.8 | 108 | — | 160 |
| 9 | 132.2 | 107 | — | 514 |
| C1 | 130.2 | 112 | 243 | 15 |
| C2 | 133.4 | 110 | — | 43 |
| C3 | 117.2 | 111 | 213 | 31 |
| C4 | 129.4 | 111 | — | 96 |
| C5 | 143.9 | 110 | 197 | 34 |
| C6 | 125.6 | 111 | — | 43 |
| C7 | 129.4 | 117 | — | 71 |

What is claimed is:

1. An anisotropic melt-forming polymer consisting essentially of recurring units I, II, III, IV, and V wherein recurring unit I is:

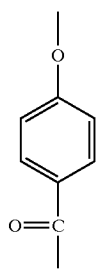

recurring unit II is:

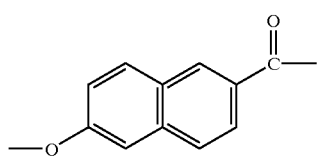

recurring unit III is:

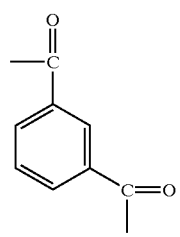

recurring unit IV is:

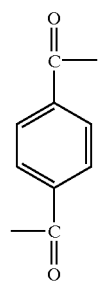

and recurring unit V is:

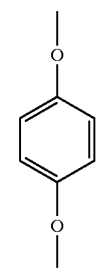

wherein recurring unit I is present in the polymer in an amount of from about 20 to about 40 mole percent, recurring unit II is present in the polymer in an amount of from about 25 to about 50 mole percent, recurring unit III is present in the polymer in an amount of from about 7.5 to about 25 mole percent, recurring unit IV is present in the polymer in an amount of from about 2.5 to about 12.5 mole percent, and recurring unit V is present in the polymer in an amount of from about 10 to about 27.5 mole percent and wherein recurring units I and II combined are present in the polymer in an amount of from about 45 to about 75 mole percent, and the mole ratio of recurring unit III to recurring unit is at least about 1.

2. A polymer as described in claim 1 wherein the mole ratio of recurring unit III to recurring unit IV is from about 1:1 to about 10:1.

3. A polymer as described in claim 2 wherein recurring unit I is present in the polymer an amount of from about 30 to about 40 mole percent.

4. A polymer as described in claim 3 wherein recurring unit V is present in the polymer in amount of from about 15 to about 25 mole percent.

5. A polymer as described in claim 4 wherein recurring units I and II combined are present in the polymer in an amount of from about 55 to about 70 mole percent.

6. A polymer as described in claim 5 wherein recurring unit III is present in the polymer in an amount of from about 7.5 to about 20 mole percent.

7. A polymer as described in claim 1 wherein no ring substitution is present on any of the recurring units.

8. A shaped article formed from the polymer of claim 1.

9. A shaped article as described in claim 8 selected from the group consisting of fiber, film, sheet and blow molded articles.

10. A multilayer laminate comprising a layer formed from the polymer of claim 1 and at least one layer formed from a thermoplastic resin.

11. A multilayer laminate as described in claim 10 wherein said thermoplastic resin comprises a thermoplastic polymer selected from the group consisting of polyolefins and polyalkylene terephthalates.

12. A multilayer laminate as described in claim 11 which further comprises at least one adhesive layer located between the layer comprised of the polymer of claim 1 and the layer comprised of said thermoplastic resin.

13. A fiber formed from the polymer of claim 1.

14. A fiber as described in claim 13 which is a bicomponent fiber.

15. A multilayer shaped article wherein the polymer of claim 1 is present as a barrier layer.

16. A highly stretchable, amorphous anisotropic melt-forming polymer consisting essentially of recurring units I, II, III, IV, and V wherein recurring unit I is:

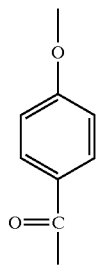

recurring unit II is:

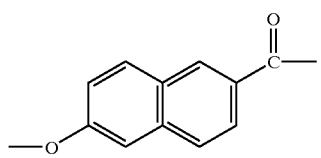

recurring unit III is:

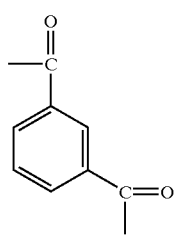

recurring unit IV is:

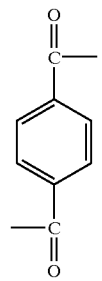

and recurring unit V is:

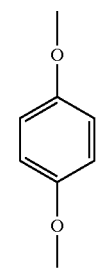

wherein recurring unit I is present in the polymer in an amount of from about 30 to about 40 mole percent, recurring unit II is present in the polymer in an amount of from about 25 to about 40 mole percent, recurring unit III is present in the polymer in an amount of from about 7.5 to about 20 mole percent, recurring unit IV is present in the polymer in an amount of from about 2.5 to about 10 mole percent, and recurring unit V is present in the polymer in an amount of from about 15 to about 25 mole percent and wherein recurring units I and II combined are present in the polymer in an amount of from about 55 to about 70 mole percent, and the mole ratio of recurring unit III to recurring unit IV is from about 1:1 to about 10:1.

* * * * *